(12) United States Patent
Iwasaki

(10) Patent No.: US 8,194,982 B2
(45) Date of Patent: *Jun. 5, 2012

(54) DOCUMENT-IMAGE-DATA PROVIDING SYSTEM, DOCUMENT-IMAGE-DATA PROVIDING DEVICE, INFORMATION PROCESSING DEVICE, DOCUMENT-IMAGE-DATA PROVIDING METHOD, INFORMATION PROCESSING METHOD, DOCUMENT-IMAGE-DATA PROVIDING PROGRAM, AND INFORMATION PROCESSING PROGRAM

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 867 days.

This patent is subject to a terminal disclaimer.

(21) Appl. No.: 12/209,369

(22) Filed: Sep. 12, 2008

(65) Prior Publication Data
US 2009/0074294 A1    Mar. 19, 2009

(30) Foreign Application Priority Data

Sep. 18, 2007 (JP) .................. 2007-241585
Aug. 15, 2008 (JP) .................. 2008-209289

(51) Int. Cl.
*G06K 9/00* (2006.01)
*G06K 9/34* (2006.01)

(52) U.S. Cl. ...................... 382/182; 382/176

(58) Field of Classification Search .................. 382/165, 382/173, 176, 180–182, 190, 209, 298, 299, 382/305; 707/3, 102, 104.1, 711, 713, 722; 348/142, 148, E07.085; 358/1.13, 1.18, 452; 711/154

See application file for complete search history.

(56) References Cited

U.S. PATENT DOCUMENTS

| 4,850,025 | A | * | 7/1989 | Abe ............................. 382/220 |
| 5,134,669 | A | * | 7/1992 | Keogh et al. .................. 382/318 |
| 5,696,844 | A | * | 12/1997 | Takagi .......................... 382/199 |
| 5,898,795 | A | * | 4/1999 | Bessho ......................... 382/173 |
| 7,756,332 | B2 | * | 7/2010 | Jager ............................ 382/173 |
| 2002/0167534 | A1 | * | 11/2002 | Burke ........................... 345/629 |

(Continued)

FOREIGN PATENT DOCUMENTS

CN    1542656 A    11/2004

(Continued)

OTHER PUBLICATIONS

U.S. Appl. No. 12/204,061, filed Sep. 4, 2008, Iwasaki.

*Primary Examiner* — Amir Alavi
(74) *Attorney, Agent, or Firm* — Oblon, Spivak, McClelland, Maier & Neustadt, L.L.P.

(57) ABSTRACT

In a document-image-data providing device, a document image inputting unit is configured to input document image data. An area recognition unit is configured to recognize a text area of a document image element containing text data among document image elements constituting the document image data, and another area of a document image element containing data other than the text data. A text data acquiring unit is configured to acquire text data contained in the recognized text area. A providing unit is configured to provide, in response to a document image data request received from the information processing device, both image data generated from the input document image data to have a resolution lower than a resolution of the input document image data and the text data acquired by the text data acquiring unit, to the information processing device.

9 Claims, 13 Drawing Sheets

U.S. PATENT DOCUMENTS

| | | | |
|---|---|---|---|
| 2003/0165264 A1* | 9/2003 | Tanabe et al. | 382/141 |
| 2004/0218836 A1 | 11/2004 | Kanatsu | |
| 2006/0173904 A1* | 8/2006 | Nakajima | 707/102 |
| 2006/0291723 A1* | 12/2006 | Koyama et al. | 382/181 |
| 2007/0065045 A1 | 3/2007 | Iwasaki | |
| 2007/0171473 A1 | 7/2007 | Iwasaki | |
| 2007/0171482 A1 | 7/2007 | Iwasaki | |
| 2009/0027699 A1* | 1/2009 | Nagai | 358/1.2 |
| 2009/0067717 A1* | 3/2009 | Iwasaki | 382/173 |
| 2009/0074294 A1* | 3/2009 | Iwasaki | 382/182 |
| 2009/0123071 A1* | 5/2009 | Iwasaki | 382/176 |
| 2009/0136125 A1* | 5/2009 | Fujita | 382/165 |
| 2011/0093667 A1* | 4/2011 | Mise et al. | 711/154 |

FOREIGN PATENT DOCUMENTS

| | | |
|---|---|---|
| JP | 2007-200014 | 8/2007 |

* cited by examiner

FIG.5

DOCUMENT TABLE 283

| DOCUMENT ID | DATE OF CREATION | NO. OF PAGES | TITLE | DOCUMENT IMAGE DATA |
|---|---|---|---|---|
| ID1 | 2007/8/9 | 1 | ABC | |
| ID2 | 2007/8/10 | 3 | DEF | |
| ... | ... | ... | ... | |

FIG.6

PAGE TABLE 284

| PAGE ID | DOCUMENT ID | PAGE NO. | THUMBNAIL IMAGE | PREVIEW IMAGE | TEXT DATA |
|---|---|---|---|---|---|
| P1 | ID1 | 1 | | | |
| P2 | ID2 | 1 | | | |
| ... | ... | ... | ... | ... | |

FIG.7

| AREA ID | DOCUMENT ID | PAGE ID | COORDINATE INFORMATION | KIND |
|---|---|---|---|---|
| a | ID1 | P1 | (x0,y0)-(x1,y1) | TEXT |
| b | ID1 | P1 | (x2,y2)-(x3,y3) | IMAGE |
| ... | ... | ... | ... | ... |

ELEMENT TABLE 285

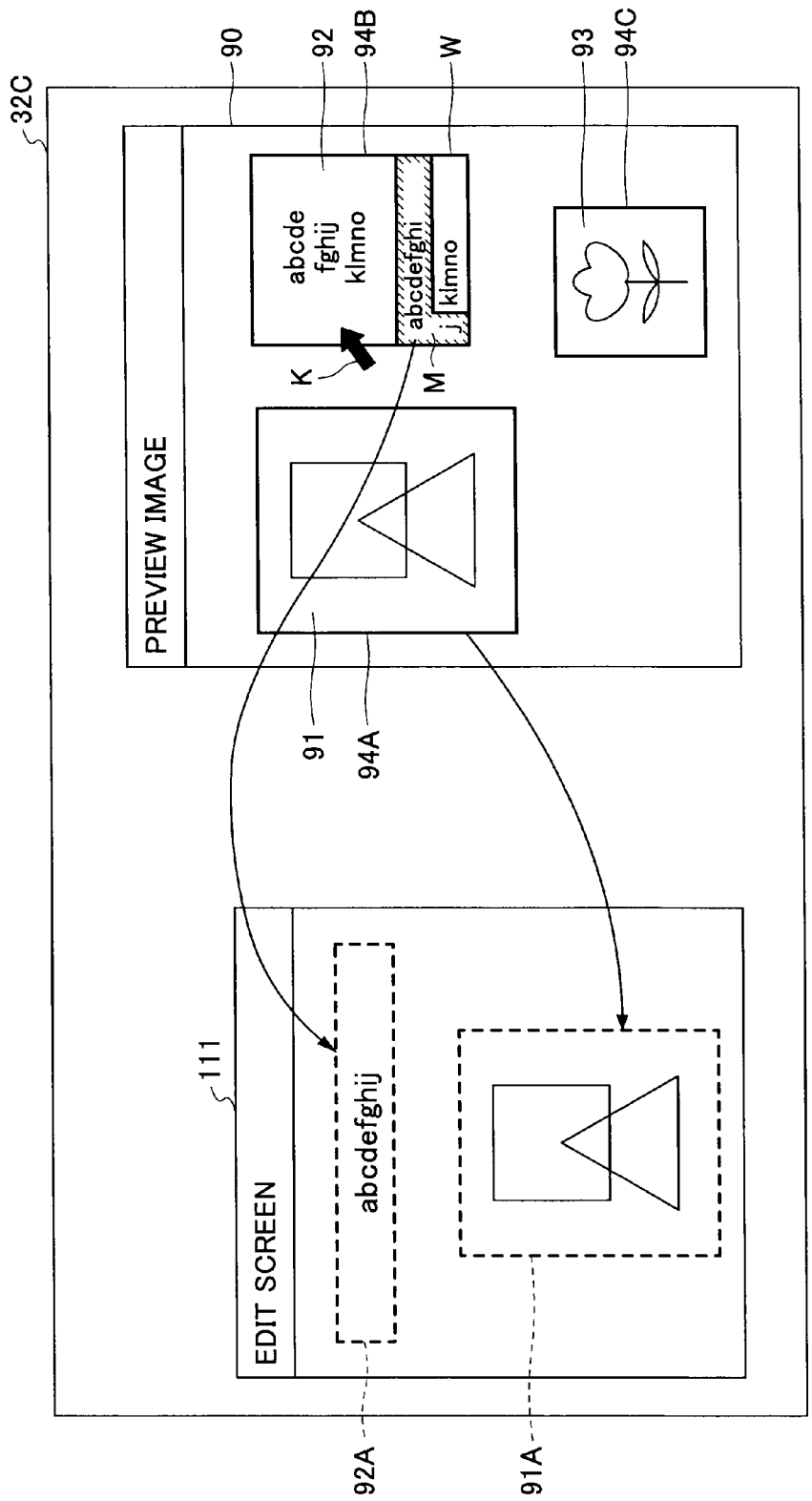

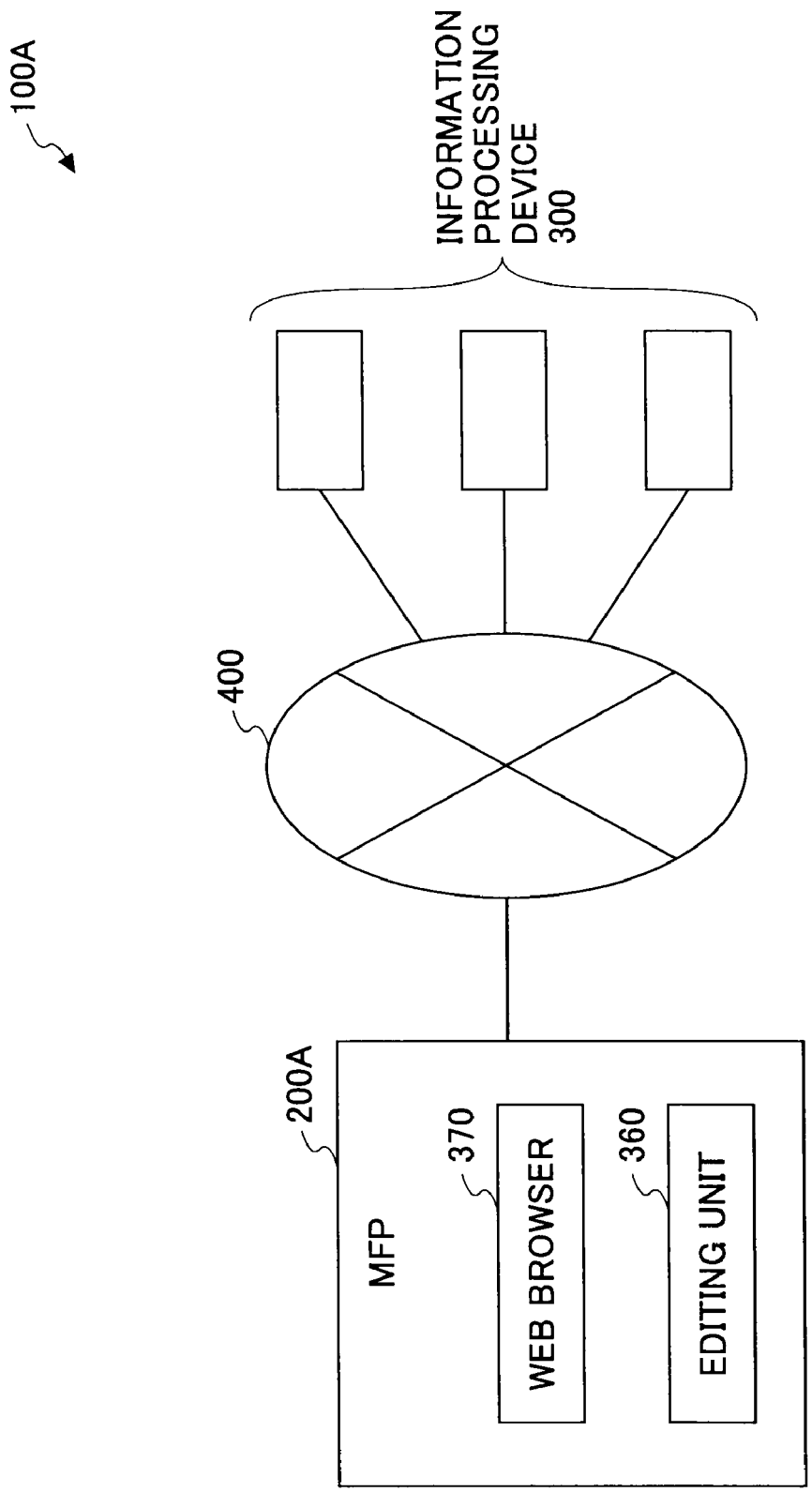

DOCUMENT-IMAGE-DATA PROVIDING SYSTEM, DOCUMENT-IMAGE-DATA PROVIDING DEVICE, INFORMATION PROCESSING DEVICE, DOCUMENT-IMAGE-DATA PROVIDING METHOD, INFORMATION PROCESSING METHOD, DOCUMENT-IMAGE-DATA PROVIDING PROGRAM, AND INFORMATION PROCESSING PROGRAM

BACKGROUND OF THE INVENTION

1. Field of the Invention

This invention generally relates to processing of document image data, and more particularly relates to a document-image-data providing system, a document-image-data providing device, an information processing device, a document-image-data providing method, an information processing method, a document-image-data providing program, and an information processing program.

2. Description of the Related Art

In recent years, the electronization of document data is progressing remarkably with improvement of the computer-related technology and maintenance of the office network environment. Conventionally, when reusing the electronic data of document images, it is conceivable that the use of an editing application program allows the data of a required portion of a document to be cut out from the document image data and the use of an OCR (optical character reader) application program allows the document image data to be converted into the character codes for reusing the document image data.

Japanese Laid-Open Patent Application No. 2007-200014 discloses an information processing device which is arranged to receive a selection of two or more objects which constitute electronic document image data, unify the selected objects into an object, and associate the unified object with the electronic document image data to manage them.

However, when it is intended to reuse only the data of a required portion of the document image data, the information processing device of Japanese Laid-Open Patent Application No. 2007-200014 is required to cut out the data of the required portion for the reuse by performing manual operation and the manual operation is complicated.

SUMMARY OF THE INVENTION

In one aspect of the invention, the present disclosure provides a document-image-data providing system, a document-image-data providing device, an information processing device, a document-image-data providing method, an information processing method, a document-image-data providing program, and an information processing program which are able to easily reuse the document image data.

In an embodiment of the invention which solves or reduces one or more of the above-mentioned problems, the present disclosure provides a document-image-data providing device which provides document image data to an information processing device, the document-image-data providing device comprising: a document image inputting unit configured to input document image data; an area recognition unit configured to recognize a text area of a document image element containing text data among document image elements constituting the input document image data, and another area of a document image element containing data other than the text data; a text data acquiring unit configured to acquire text data contained in the text area recognized by the area recognition unit; and a providing unit configured to provide, in response to a document image data request received from the information processing device, both image data generated from the input document image data to have a resolution lower than a resolution of the input document image data and the text data acquired by the text data acquiring unit, to the information processing device.

In an embodiment of the invention which solves or reduces one or more of the above-mentioned problems, the present disclosure provides an information processing device which is connected to the above-mentioned document-image-data providing device, the information processing device comprising: an acquisition unit configured to acquire the input document image data and the text data contained in the recognized text area from the document-image-data providing device; a document image element selecting unit configured to select a document image element which constitutes the input document image data, from the input document image data; and a display control unit configured to display, when element data of the document image element selected by the document image element selecting unit is text data, text data corresponding to the element data in the text data acquired by the acquisition unit on a display device.

Other objects, features and advantages of the present invention will become more apparent from the following detailed description when read in conjunction with the accompanying drawings.

BRIEF DESCRIPTION OF THE DRAWINGS

FIG. 5 is a diagram showing an example of the data structure of a document table.

FIG. 6 is a diagram showing an example of the data structure of a page table.

FIG. 7 is a diagram showing an example of the data structure of an element table.

FIG. 13 is a diagram showing an example of a display screen in which a preview image and an edit screen are displayed.

FIG. 14 is a block diagram showing the composition of a document-image-data providing system of a second embodiment of the invention.

DETAILED DESCRIPTION OF THE PREFERRED EMBODIMENTS

A description will be given of embodiments of the invention with reference to the accompanying drawings.

In a document-image-data providing system of an embodiment of the invention, if a document image data is input, a document-image-data providing device recognizes respective areas of document image elements which constitute the document image data. And if a document image element is selected from the document image in an information processing device which is connected to the document-image-data providing device via a network, the document-image-data providing device extracts the element data of the selected document image element from the document image data and provides the information processing device with the element data.

Figure 1:
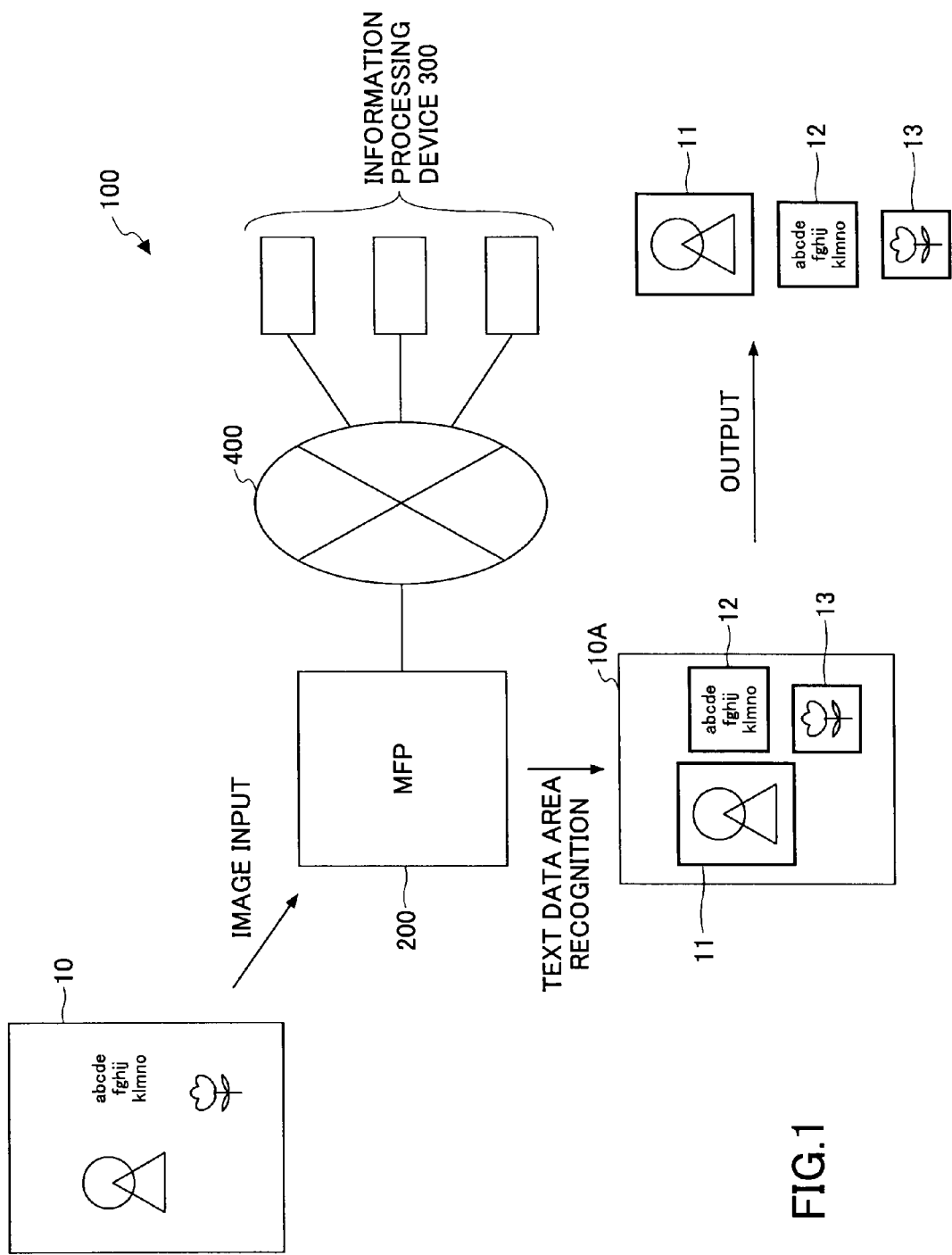
FIG. 1 is a diagram showing the composition of a document-image-data providing system of an embodiment of the invention.

FIG. 1 shows the composition of a document-image-data providing system 100 of an embodiment of the invention. In this embodiment, the document-image-data providing device is constituted by a multi-function peripheral (MFP) as an image processing device which is able to store document image data and has multiple functions including a scanner function, a copier function and a facsimile function, and the information processing device is constituted by a general-purpose computer which has a processing unit and a storage unit.

The document-image-data providing system 100 of FIG. 1 is constituted by a multi-function peripheral (MFP) 200 and information processing devices 300 which are connected together via a network 400.

In the document-image-data providing system 100, if a document image data 10 is input and read out as a document image data 10A, the MFP 200 recognizes respective areas of document image elements 11, 12 and 13 which constitute the document image data 10A. At this time, the MFP 200 recognizes areas of document image elements containing text data and areas of document image elements containing image data other than text data.

The text data mentioned above indicates a set of character codes contained in the document image data 10A. In the example of FIG. 1, the MFP 200 recognizes the respective areas of the document image elements 11, 12, and 13 which constitute the document image data 10A. Moreover, the MFP 200 associates the document image data 10A and the document image elements 11, 12 and 13, and stores them therein.

When a document image element other than the document image element containing text data is selected from among the document image elements 11, 12 and 13 in the information processing device 300, the MFP 200 extracts the element data corresponding to the selected document image element from the document image data 10A, and provides it to the information processing device 300 (outputting).

On the other hand, the procedure which is performed by the MFP 200 when a document image element containing text data is selected in the information processing device 300 will be described later.

The information processing device 300 acquires the element data provided by the MFP 200, so that the information processing device 300 can edit the document image data 10A using the acquired element data.

In this embodiment, when an area of a document image element is in the form of a rectangle, recognition of the area of the document image element may be performed by acquiring the position information of a point at the upper left corner of the area (the rectangle) and the position information of a point at the lower right corner of the area (the rectangle). On the other hand, when an area of a document image element is not in the form of a rectangle, recognition of the area may be performed by acquiring the position information of upper-left corner and lower-right-corner points of a rectangle circumscribing the document image element.

In this embodiment, the extraction of the element data may be performed by generating a duplicate data of the element data of the document image element selected from the document image data 10 and transferring the duplicate data.

The document image elements may be images, text, figures, tables, etc. which are contained in a document image. The element data may be the data corresponding to each document image element. For example, when an image and text are contained in document image data, the document image elements are the image and the text. The corresponding element data when the document image element is an image is acquired as image data. The corresponding element data when the document image element is text is acquired as text data. For example, when the document image elements are figures or tables, the figures and the tables are recognized as an image and the element data in that case is acquired as image data indicating the figures or tables.

Table 1 shows the relationship between the kinds of document image elements and the corresponding element data being acquired. As shown in Table 1, when the document image elements are images, figures or tables, the element data is acquired as image data in this embodiment. When the document image elements are text, the element data is acquired as text data in this embodiment.

TABLE 1

| Kinds of Document Image Elements | Element Data |
| --- | --- |
| Images | Image Data |
| Figures | Image Data |
| Tables | Image Data |
| Text | Text Data |

Figure 2:
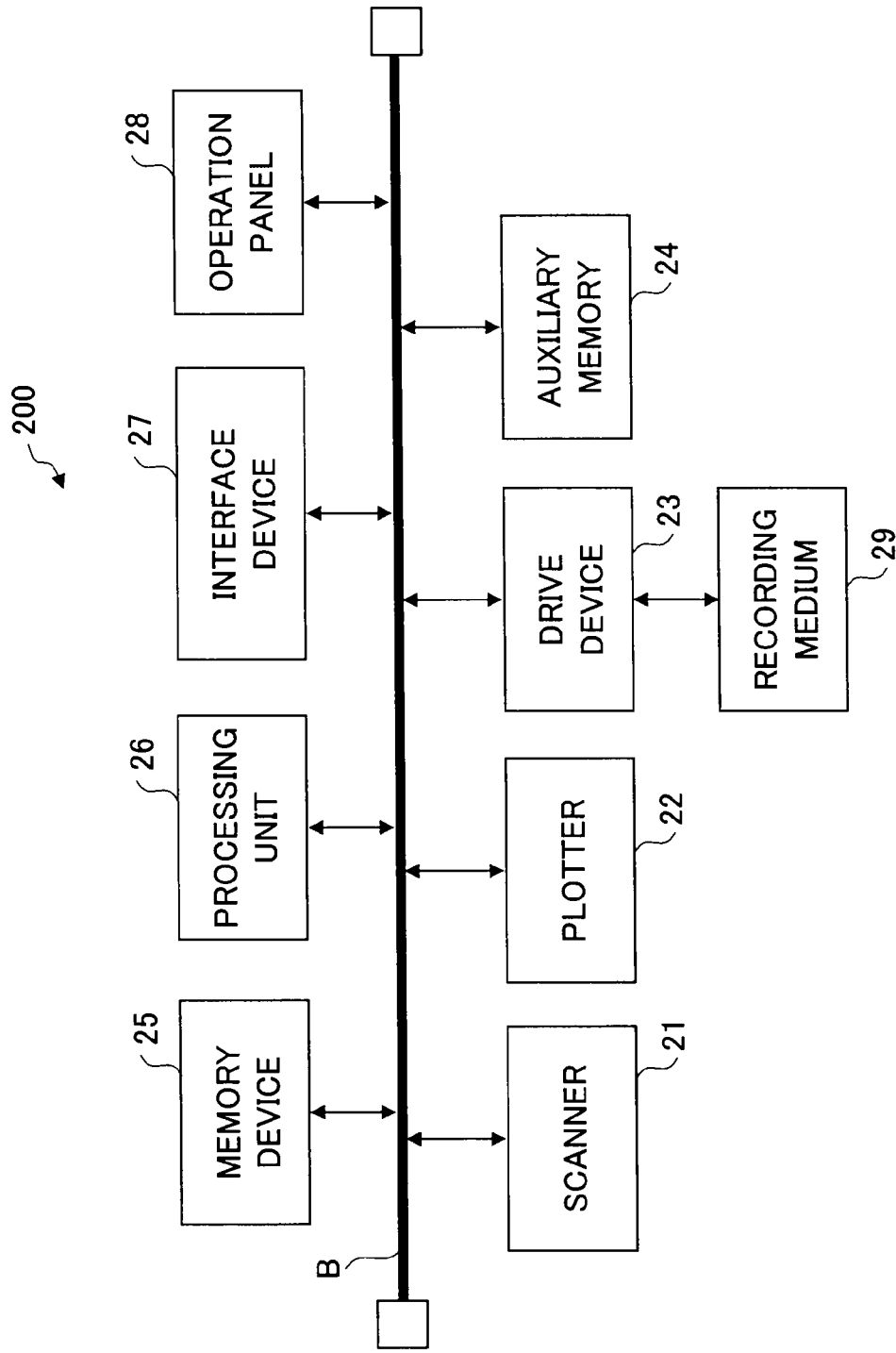
FIG. 2 is a block diagram showing the hardware composition of a multi-function peripheral (MFP) of an embodiment of the invention.

FIG. 2 shows the hardware composition of a multi-function peripheral (MFP) 200 of an embodiment of the invention.

The MFP 200 includes a scanner 21, a plotter 22, a drive device 23, an auxiliary memory 24, a memory device 25, a processing unit 26, an interface device 27, and an operation panel 28, which are respectively interconnected by a bus B.

The scanner 21 includes a scanner engine and an engine control section, and this scanner 21 is used to obtain document image data by reading a printing medium (for example, a print sheet) on which a document image is printed.

The plotter 22 includes a plotter engine and an engine control section, and this plotter 22 is used to output image data to a printing medium, such as a print sheet.

The interface device 27 includes a modem or a LAN card, and this interface device 27 is used to connect the MFP 200 with a network 400.

The operation panel 28 is a component used for operating the MFP 200, and this operation panel 28 includes a touch panel which is provided with both a displaying function and an inputting function.

The image processing program of an embodiment of the invention is constituted by at least a part of various programs which are used to control the MFP 200. For example, the image processing program is supplied by distributing a recording medium 29 to the MFP 200 or downloading of the program from the network 400 to the MFP 200.

Examples of the recording medium 29 storing the image processing program thereon may include various types of recording media: recording media on which information is recorded optically, electrically or magnetically, such as a CD-ROM, a flexible disk, or a magneto-optic disk, or semiconductor memories on which information is electrically recorded, such as a ROM or a flash memory.

When the recording medium 29 storing the image processing program thereon is set in the drive device 23, the image processing program from the recording medium 29 is installed in the auxiliary memory 24 through the drive device 23. The image processing program downloaded from the network 400 is installed in the auxiliary memory 24 through the interface device 27.

The auxiliary memory 24 in the MFP 200 stores the installed image processing program, the necessary files, and data. The memory device 25 reads the image processing program from the auxiliary memory 24 and stores it therein at the time of startup of the MFP 200. The processing unit 26 carries out various procedures which will be described later, in accordance with the image processing program stored in the memory device 25.

Figure 3:
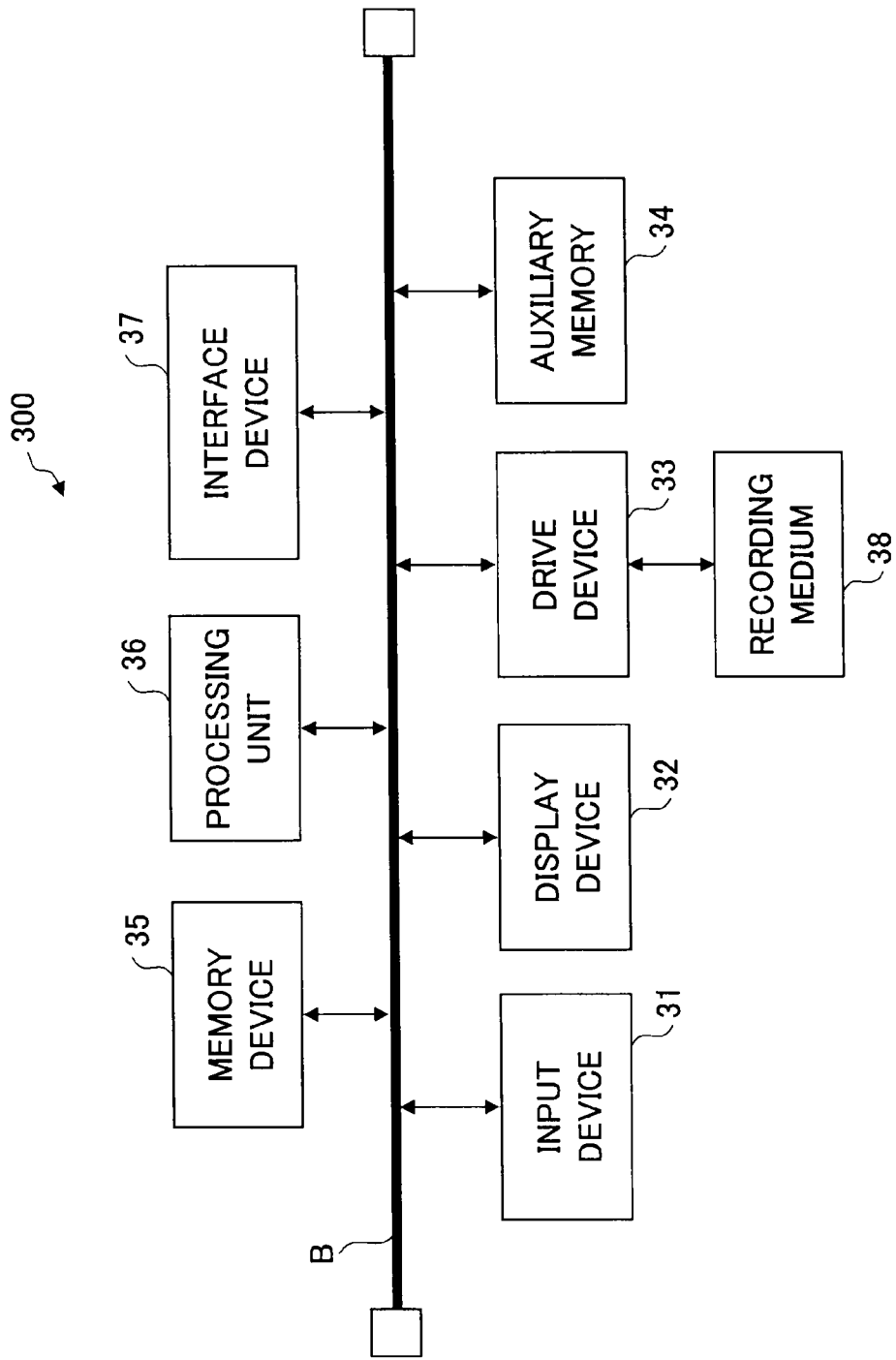
FIG. 3 is a block diagram showing the hardware composition of an information processing device of an embodiment of the invention.

FIG. 3 shows the hardware composition of an information processing device 300 of an embodiment of the invention. As shown in FIG. 3, the information processing device 300 includes an input device 31, an output device 32, a drive device 33, an auxiliary memory 34, a memory device 35, a processing unit 36, and an interface device 37, which are respectively interconnected by a bus B.

The input device 31 includes a keyboard, a mouse, etc., and this input device 31 is used to input various signals. The display device 32 includes a display unit, etc., and this display device 32 is used to display various windows, data, etc. The interface device 37 includes a modem or a LAN card, and this interface device 37 is used to connect the information processing device 300 with the network 400.

The information processing program of an embodiment of the invention is constituted by at least a part of various programs which are used to control the information processing device 300. For example, the information processing program is supplied by distributing a recording medium 38 to the information processing device 300 or downloading of the program from the network 400 to the information processing device 300.

Examples of the recording medium 38 storing the information processing program thereon may include various types of recording media: recording media on which information is recorded optically, electrically or magnetically, such as a CD-ROM, a flexible disk, or a magneto-optic disk, or semiconductor memories on which information is electrically recorded, such as a ROM or a flash memory.

When the recording medium 38 storing the information processing program thereon is set in the drive device 33, the information processing program from the recording medium 38 is installed in the auxiliary memory 34 through the drive device 33. The information processing program downloaded from the network 400 is installed in the auxiliary memory 34 through the interface device 37.

The auxiliary memory 34 in the information processing device 300 stores the installed information processing program, the necessary files, and data. The memory device 35 reads the information processing program from the auxiliary memory 34 and stores it therein at the time of startup of the information processing device 300. The processing unit 36 carries out various procedures which will be described later, in accordance with the information processing program stored in the memory device 35.

Figure 4:
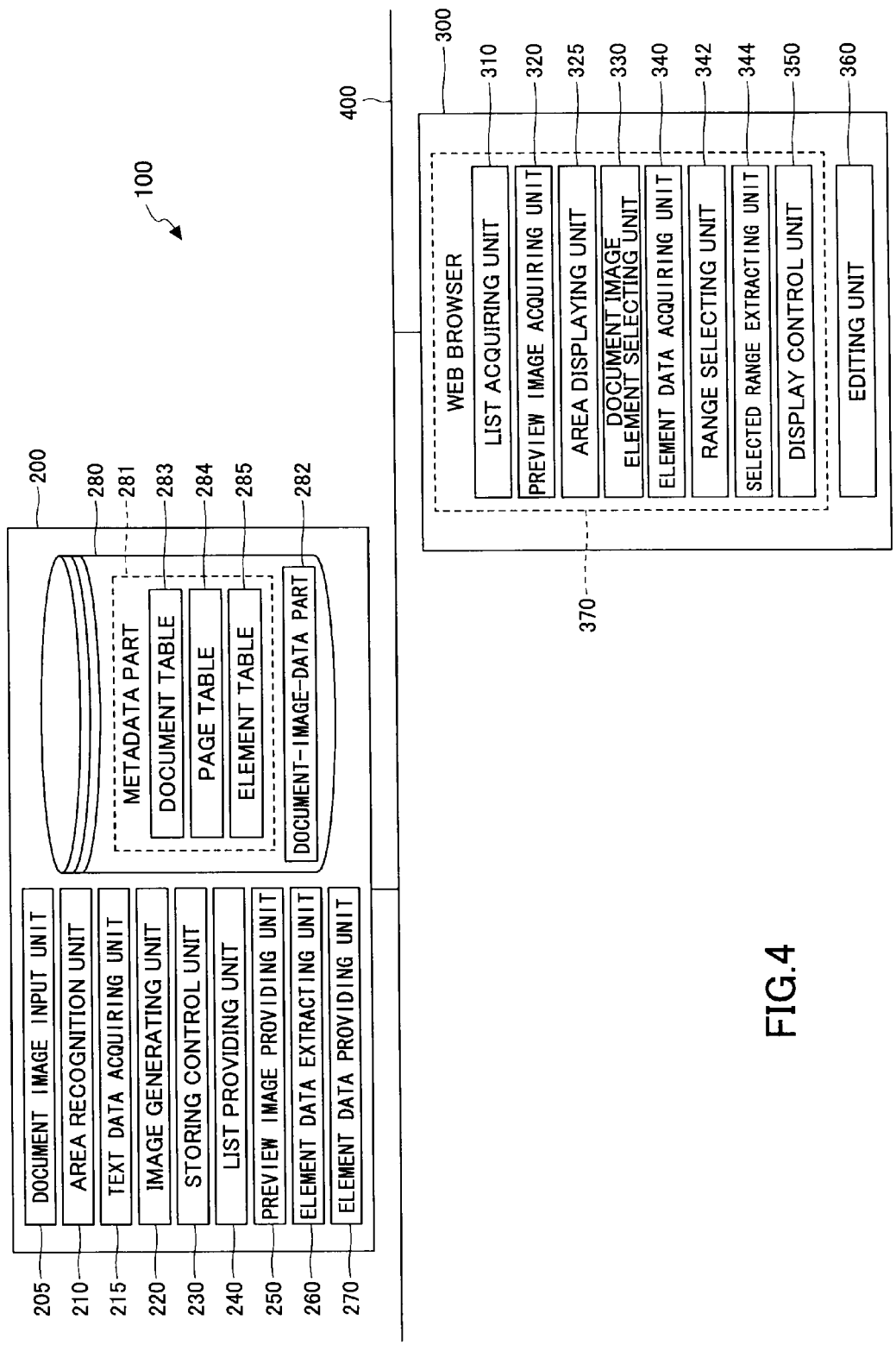
FIG. 4 is a block diagram showing the functional composition of each of a multi-function peripheral (MFP) and an information processing device in a document-image-data providing system of a first embodiment of the invention.

FIG. 4 shows the functional composition of each of a multi-function peripheral (MFP) and an information processing device in a document-image-data providing system of a first embodiment of the invention.

The MFP 200 of this embodiment includes a document image input unit 205, an area recognition unit 210, a text data acquiring unit 215, an image generating unit 220, a storing control unit 230, a list providing unit 240, a preview image providing unit 250, an element data extracting unit 260, and an element data providing unit 270. The MFP 200 further includes a database 280 which is arranged in the auxiliary memory 24.

The document image input unit 205 scans a document image (original document) and inputs the corresponding document image into the MFP 200 as document image data.

The document image recognition unit 210 recognizes respective areas of document image elements which constitute the document image data. Specifically, the area recognition unit 210 determines which of text data, figure date, table data, photographic data, etc., is contained in each of the respective areas based on the features of data contained in the input document image data, and determines the kind of data in each area based on the features of the data in that area, so that the document image elements are recognized.

The area recognition unit 210 of this embodiment recognizes an area of a document image element containing text data as a text area, and recognizes an area of a document image element other than the document image element containing text data as an image area. In the area recognition unit 210 of this embodiment, the area information of a document image element can be acquired based on the coordinate information of a document image element in the document image data. The method of area recognition is known in the related art, and a detailed description thereof will be omitted.

The text data acquiring unit 215 acquires text data from the document image element of the area recognized as a text area by the area recognition unit 210. For example, the text data acquisition unit 215 is provided by using the OCR (optical character recognition) function of the MFP 200. The text data acquired by the text data acquisition unit 215 is stored in the database 280 which will be described later.

The image generating unit 220 generates a document image data having a resolution which is lower than that of the input document image data, by using the input document image data from the document image input unit 205.

The image generating unit 220 of this embodiment generates both a first document image data having a resolution which is lower than that of the input document image data, and a second document image data having a resolution which is still lower than that of the first document image data. The details of the first document image data and the second document image data will be described later.

The storing control unit 230 controls storing of document image data into the database 280 which will be described later. The list providing unit 240 acquires a list of the document image data stored in the database 280 from the database 280 and provides (outputs) the list to the information processing device 300.

The preview image providing unit 250 acquires data of a selected preview image from the database 280 and provides (outputs) the selected preview image data to the information processing device 300. The preview image providing unit 250 provides both the text data contained in the document image data (which is the source of the preview image) and the area information of the document image element recognized in the document image data to the information processing device 300, together with the preview image data.

The element data extracting unit 260 extracts the element data corresponding to a selected document image element from the input document image data. The element data providing unit 270 provides (outputs) the element data extracted by the element data extracting unit 260, to the information processing device 300.

The database 280 includes a metadata part 281 in which the metadata of the document image data is stored, and a document-image-data part 282 in which the document image data is stored.

The metadata part 281 includes a document table 283 in which information (bibliographic information) indicating the attributes of the document image data is stored, a page table 284 in which information indicating the pages contained in the document image data is stored, and an element table 285 in which the information of every document image element is stored.

FIG. 5 shows an example of the data structure of a document table 283. In the document table 283 of FIG. 5, the bibliographic information of the input document image data is stored. Specifically, the document ID for identifying the document image data, the date of creation of the document image data, the number of pages of the document image data, and the title of the document image data are associated and stored in the document table 283.

In the document table 283 of this embodiment, when the document image data is directly input from a recording medium, such as a memory card, the document image data is directly stored in the document table 283.

In this embodiment, when document images of two or more pages are collectively read by the scanner 21 using the ADF (automatic document feeder) function, the document images of two or more pages may be converted into document image data in the format that allows the plural images to be processed as one file, and subsequently the document image data may be stored in the document table 283.

In the page table 284, the information for managing the document image data of each of the respective pages is stored. FIG. 6 shows an example of the data structure of a page table 284.

In the page table 284 of FIG. 6, a page ID, a document ID, a page number, a thumbnail image, a preview image, and text data (acquired by the text data acquiring unit 215) are associated and stored. The page ID is an identifier for identifying each page of the document image data. The document ID is an identifier for identifying the document image data containing the page specified by the page ID. The page number is a number of a corresponding page in the document image data specified by the document ID. The thumbnail image is a thumbnail image of the corresponding page. The preview image is a preview image of the corresponding page.

A description will be given of the thumbnail image and the preview image. In this embodiment, if a document image data is input, the image generating unit 220 generates a document image data (preview image data) for preview image having a resolution lower than that of document image data of each of the respective pages contained in the document image data. This preview image data is called the first document image data.

Moreover, the image generating unit 220 generates a document image data for thumbnail image (thumbnail image data) having a resolution which is still lower than that of the document image data for preview image. This thumbnail image data is called the second document image data.

In the MFP 200 of this embodiment, if the document image data is input and the preview image data and the thumbnail image data are generated, the storing control unit 230 stores the preview image data and the thumbnail image data in the corresponding locations of the page table 284.

The document image data obtained when the document image is scanned by the scanner 21 is stored in the document-image-data part 282 of the database 280. In the document-image-data part 282, the document image data is associated with the page table 284 of the metadata part 281 by the page ID contained in the document image data.

The document image data stored in the document-image-data part 282 of this embodiment is stored with the resolution that is the same as the resolution obtained when the document image is scanned by the scanner 21. Accordingly, even after the document image data is copied to another application, the document image data stored in the document-image-data part 282 allows reproduction of an image with a sufficiently reusable resolution.

In this embodiment, when the resolution of the document image data stored in the document-image-data part 282 is equal to 600 dpi, it is preferred that the resolution of the preview image data is set to about 100 dpi, and that the image size of the thumbnail image data is unified and set to about 100 pixels×100 pixels, in order to improve the listing characteristics.

Moreover, a page image data having a different resolution may be further stored in the page table 284 in addition to the thumbnail image data and the preview image data. The resolution of the page image data in such a case may be set up beforehand by a system administrator of the document-image-data providing system. In this case, if the document image data is input, the image generating unit 220 generates a page image data having the set-up resolution, in addition to the thumbnail image data and the preview image data. The storing control unit 230 associates the generated page image data with the page ID and stores it in the page table 284.

FIG. 7 shows an example of the data structure of an element table 285.

In the element table 285, the information of each of the respective document image elements obtained by the recognition of the document image elements by the area recognition unit 210 based on the document image data input by the document image input unit 205 is stored therein.

In the element table 285 of FIG. 7, an area ID which is an identifier for identifying the area of a document image element, a document ID which identifies the document image data containing the document image element, a page ID which identifies the page containing the document image element, position information (coordinate information) which indicates a position of the document image element in the document image data, and the kind of the document image element are associated and stored therein.

Referring back to FIG. 4, the information processing device 300 which constitutes part of the document-image-data providing system 100 of this embodiment will be explained.

The information processing device 300 includes a list acquiring unit 310, a preview image acquiring unit 320, an area displaying unit 325, a document image element selecting unit 330, an element data acquiring unit 340, a range selecting unit 342, a selected range extracting unit 344, a display control unit 350, and an editing unit 360.

The list acquiring unit 310 acquires a list of the document image data stored in the database 280 of the MFP 200. The preview image acquiring unit 320 acquires a preview image data corresponding to a preview image selected from the list of the document image data acquired by the list acquiring unit 310. Moreover, the preview image acquiring unit 320 acquires the text data contained in the document image data corresponding to the preview image data, and the area information of the document image elements recognized in the document image data.

The area displaying unit 325 performs the displaying of the area of each of the respective document image elements when displaying the acquired preview image data. The document image element selecting unit 330 selects a document image element from the document image. The element data acquiring unit 340 acquires the element data corresponding to the document image element selected by the document image element selecting unit 330.

The range selecting unit 342 selects a range of text data to be extracted from the text data, acquired simultaneously with the preview image, by the preview image acquiring unit 320. The details of the extraction of text data will be described later.

The selected range extracting unit 344 extracts the text data of the range selected by the range selecting unit 342, from the text data acquired by the preview image acquiring unit 320. The display control unit 350 controls the displaying of an image on the display device 32. The editing unit 360 performs an editing operation for the element data acquired by the element data acquiring unit 340.

For example, the editing unit 360 may be constituted by an editing application installed in the information processing device 300 in order to allow the editing unit 360 to edit the element data.

In this embodiment, the list acquiring unit 310, the preview image acquiring unit 320, the document image element selecting unit 330, the element data acquiring unit 340, the range selecting unit 342, the selected range extracting unit 344, and the display control unit 350 are constituted by a Web browser 370 arranged in the information processing device 300.

Next, with reference to FIG. 8 and FIG. 9, operation of the document-image-data providing system 100 of this embodiment will be explained.

Figure 8:
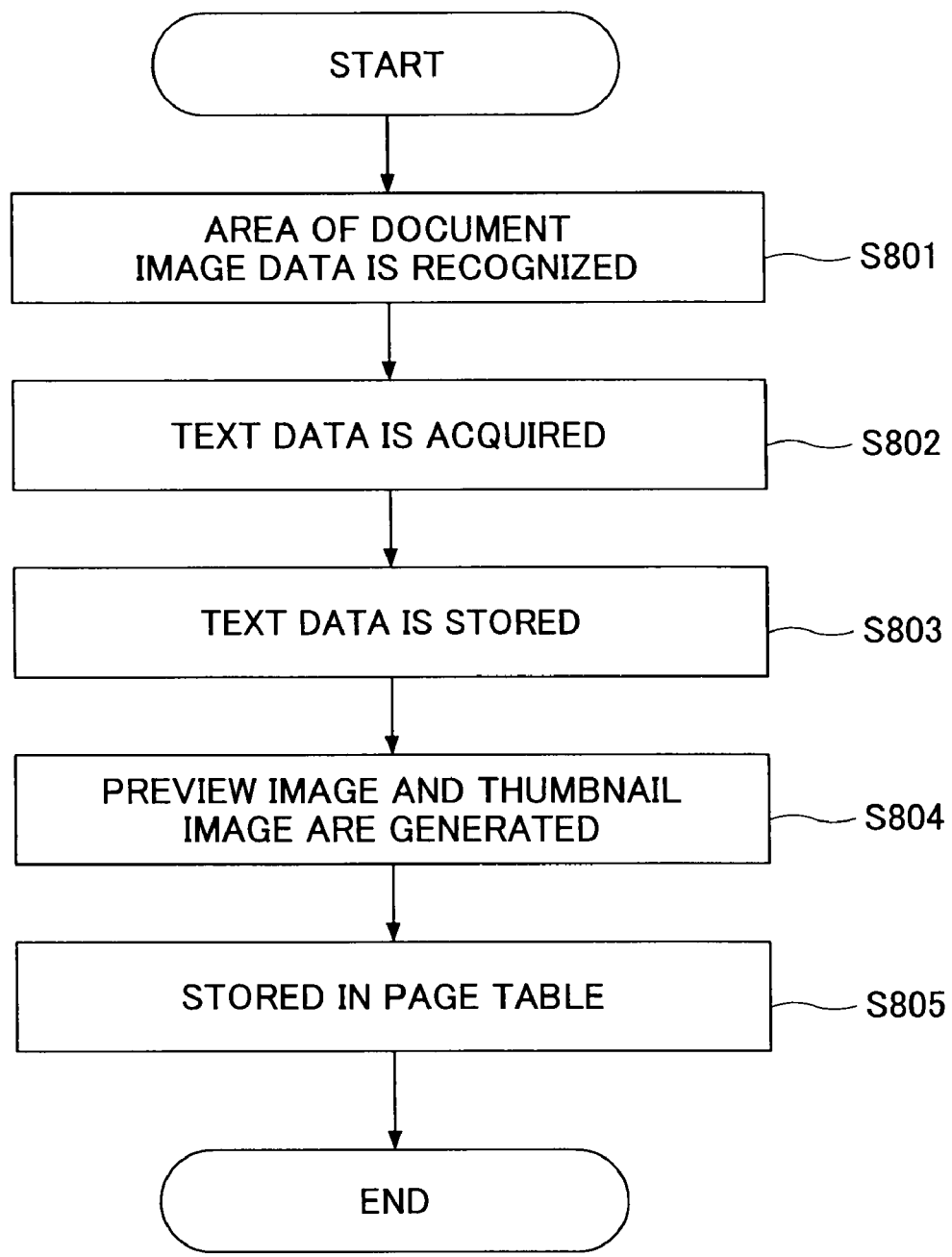
FIG. 8 is a flowchart for explaining the registering of document image data by the document-image-data providing system of the first embodiment.

FIG. 8 is a flowchart for explaining the registering (accumulation) of document image data by the document-image-data providing system 100 of the first embodiment.

When a document image data is input by the document image input unit 205 of the MFP 200, the area of each document image element is recognized by the area recognition unit 210 (step S801). In step S801, after the respective areas of the document image elements are recognized, the storing control unit 230 stores bibliographic information of the document image data contained in the document image data, into the document table 283.

Moreover, in step S801, the storing control unit 230 stores the information of each of the respective pages contained in the document image data, into the page table 284. The storing control unit 230 stores the information of each of the respective recognized document image elements into the element table 285. Furthermore, the storing control unit 230 stores the document image data into the document-image-data part 282.

Progressing to step S802 following step S801, the MFP 200 causes the text data acquiring unit 215 to acquire the text data which is the element data corresponding to the document image element recognized as the text area among the document image elements at step S801. Progressing to step S803 following step S802, the storing control unit 230 stores the text data acquired by the text data acquiring unit 215, into the page table 284.

Progressing to step S804 following step S803, the image generating unit 220 generates a preview image data and a thumbnail image data based on the document image data input at the step S801. Specifically, the image generating unit 220 compresses the document image data and generates the preview image data and the thumbnail image data.

Progressing to step S803 following step S802, the storing control unit 230 stores the generated preview image data and thumbnail image data into the page table 284.

In this manner, the document image data is registered and stored in the MFP 200 of this embodiment.

Next, the displaying of document image data by the information processing device 300 of this embodiment will be explained.

Figure 9:
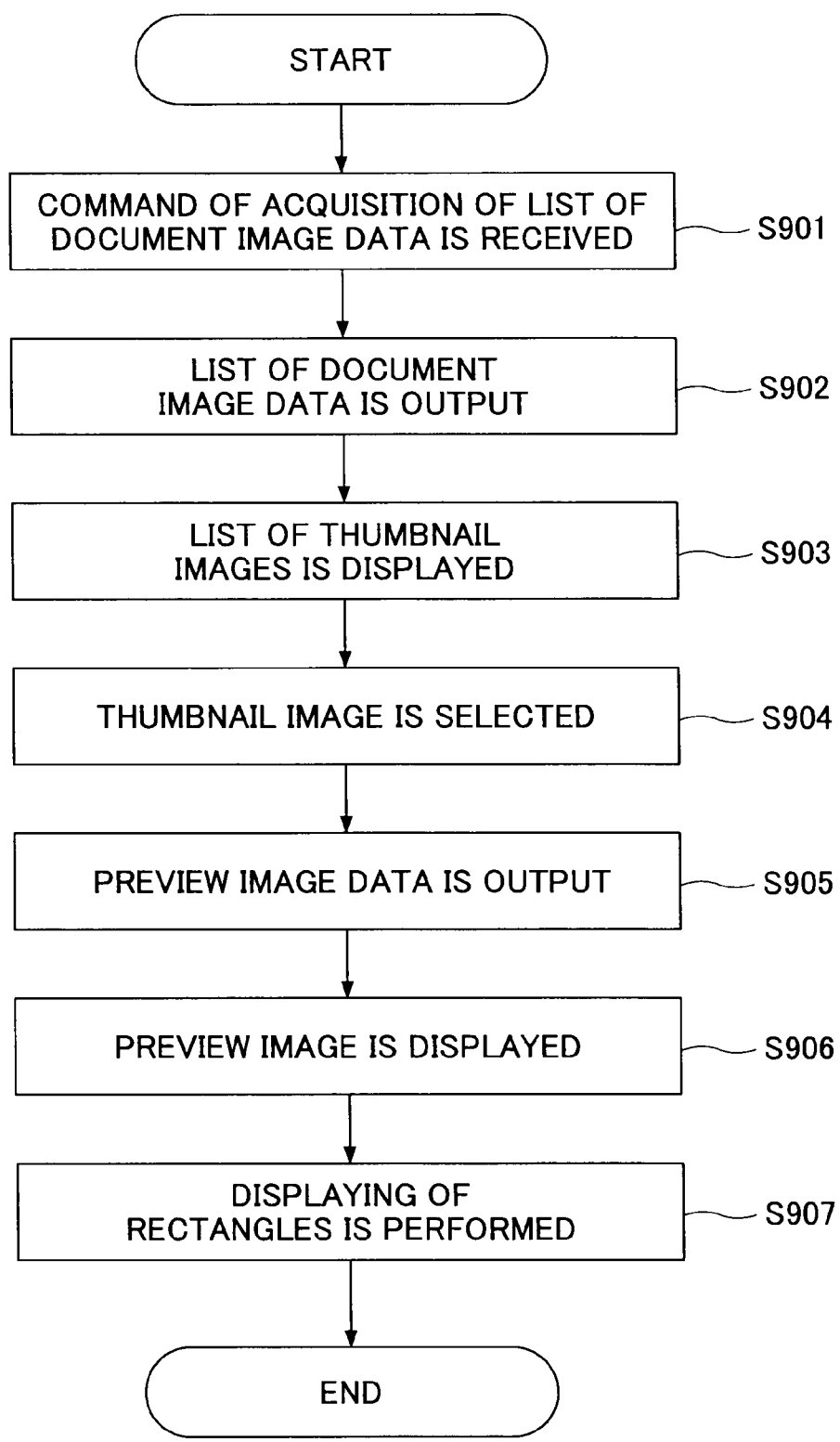
FIG. 9 is a flowchart for explaining the displaying of document image data by the document-image-data providing system of the first embodiment.

FIG. 9 is a flowchart for explaining the display of document image data by the document-image-data providing system 100 of the first embodiment.

In step S901, the information processing device 300 receives a command of acquisition of a list of document image data, and the control progresses to step S902.

In step S902, the MFP 200 causes the list providing unit 240 to provide the information processing device 300 with a list of the document image data stored in the database 280, in response to the list acquisition command received from the information processing device 300. At this time, the list providing unit 240 acquires a list of thumbnail image data stored in the page table 284 as the list of the document image data and outputs it to the information processing device 300.

Progressing to step S903 following step S902, the information processing device 300 causes the list acquiring unit 310 to acquire the list of the thumbnail image data output from the MFP 200. Moreover, in step S903, the information processing device 300 causes the display control unit 350 to display the acquired list on the display device 32.

Figure 10:
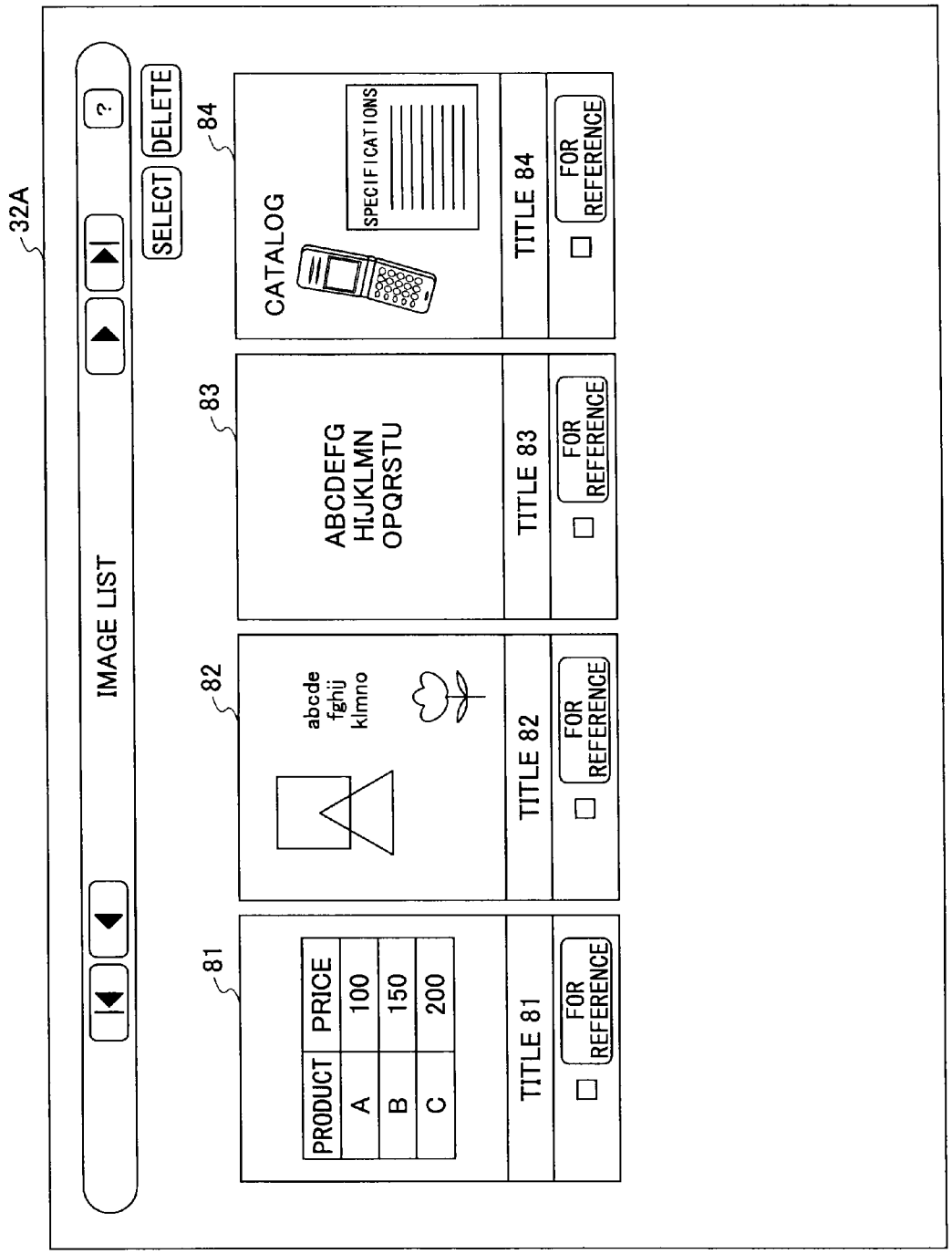
FIG. 10 is a diagram showing an example of a display screen in which a list of document image data is displayed on a display device.

FIG. 10 shows an example of a display screen in which a list of thumbnail images is displayed on the display device 32. As shown in FIG. 10, the list displayed on the display device 32 is represented by the thumbnail images of the document image.

In the display screen 32A of FIG. 10, four thumbnail images 81-84 are displayed as a list of document image data. The title of each document image data is displayed under each thumbnail image.

For example, when the document image data of two or more pages is provided in the format to be processed as one file, only the thumbnail images of the document image data of the first page may be displayed in the display screen 32A.

Referring back to FIG. 9, the control progresses to step S904 following step S903. In step S904, a thumbnail image is selected from the list of the thumbnail images in the display screen 32A in the information processing device 300. The information processing device 300 of this embodiment may be arranged so that, when a thumbnail image in the display screen 32A is clicked by a pointing device, such as a mouse, the thumbnail image is selected.

Progressing to step S905 following step S904, after the thumbnail image is selected, the MFP 200 causes the preview image providing unit 250 to acquire the preview image data corresponding to the selected thumbnail image from the database 280. Moreover, in step S905, the MFP 200 causes the preview image providing unit 250 to provide the acquired preview image data to the information processing device 300.

At this time, the MFP 200 causes the preview image providing unit 250 to provide the area information of the document image elements and the text data stored in the page table 284 to the information processing device 300, together with the preview image data.

Progressing to step S906 following step S905, the information processing device 300 causes the preview image acquiring unit 320 to acquire the preview image data and the position information of the document image elements from the MFP 200. Moreover, in step S906, the information processing device 300 causes the display control unit 350 to display a preview image on the display device 32 based on the acquired preview image data.

Progressing step S907 following step S906, the information processing device 300 causes the area displaying unit 325 to display the rectangles, which respectively represent the areas of the document image elements, within the preview image based on the position information of the document image elements.

After the step S907 is performed, the displaying of the document image data is terminated.

Figure 11:
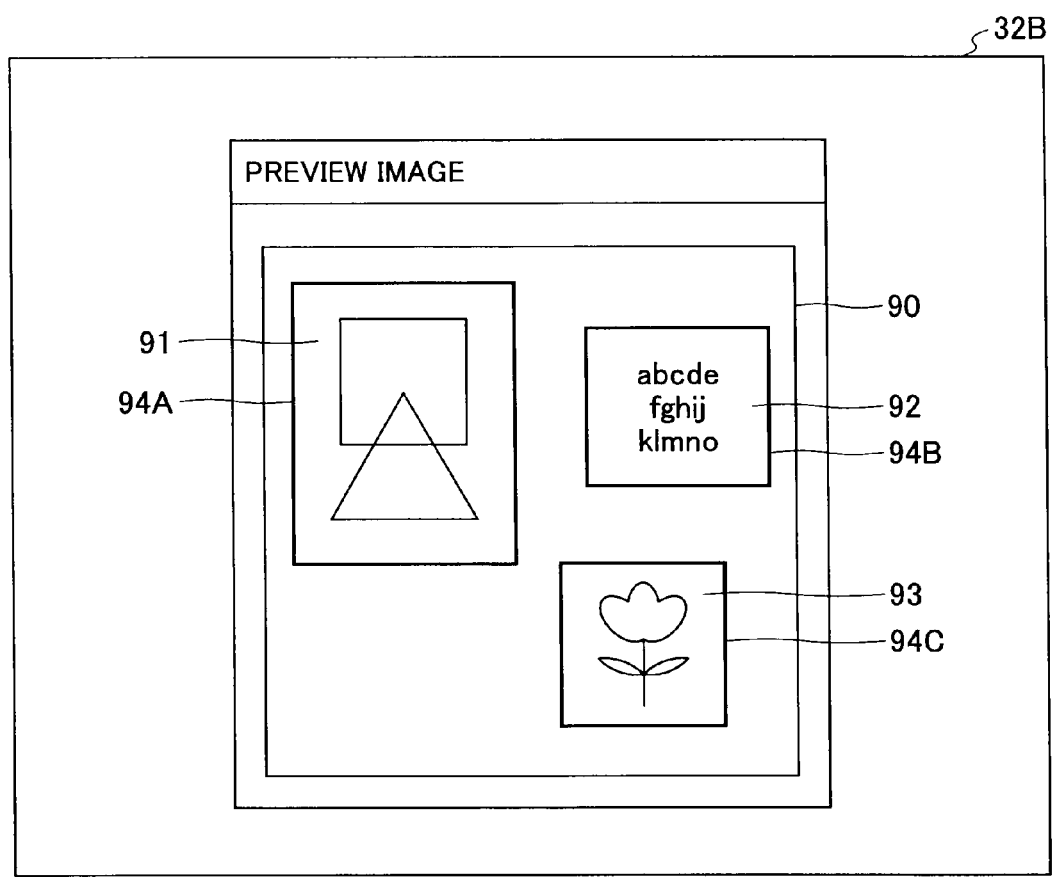
FIG. 11 is a diagram showing an example of a display screen in which a preview image is displayed on a display device.

Next, the displaying of rectangles will be explained. FIG. 11 shows an example of a display screen 32B in which a preview image is displayed on the display device 32.

The display screen 32B of FIG. 11 is a display screen when a thumbnail image 82 is selected from the list of the document image data of FIG. 10.

Suppose that the source document image from which the preview image 90 displayed in the display screen 32B is generated contains document image elements 91, 92 and 93. Therefore, a rectangle 94A which indicates the area of the document image element 91, a rectangle 94B which indicates the area of the document image element 92, and a rectangle 94C which indicates the area of the document image element 93 are displayed within the preview image 90.

These rectangles 94A, 94B, and 94C are displayed based on the position information of the document image elements 91, 92 and 93 acquired together with the preview image data in order for displaying the preview image 90.

In this embodiment, the layout of the document image elements 91, 92 and 93 within the preview image 90 is the same as the layout of the document image elements in the source document image which provides the document image data.

In this embodiment, it is also possible to change the color of the rectangles 94A, 94B, and 94C being displayed by the area displaying unit 325 according to the kind of the document image element. For example, when the kind of the document image element 91 is an image, the color of the rectangle 94A may be changed to blue, and when the kind of the document image element 92 is text, the color of the rectangle 94B may be changed to red.

As described above, in this embodiment, the document image data is registered in the MFP 200, and the registered document image data is displayed on the information processing device 300.

In the document-image-data providing system 100 of this embodiment, the above-described functions of the MFP 200 and the information processing device 300 are used, and the element data of the document image data stored in the MFP 200 can be reused so that the editing of a document image can be performed.

Next, the editing of a document image in this embodiment will be explained.

In the information processing device 300 of this embodiment, when the editing unit 360 displays an edit screen of the document image on the display device 32, the document image can be edited using the element data.

In the information processing device 300 of this embodiment, the preview image and the edit screen are displayed on the display device 32. If the document image element of the preview image is dragged and dropped to the edit screen using the mouse, the element data of the selected document image element can be attached to the edit screen.

Figure 12:
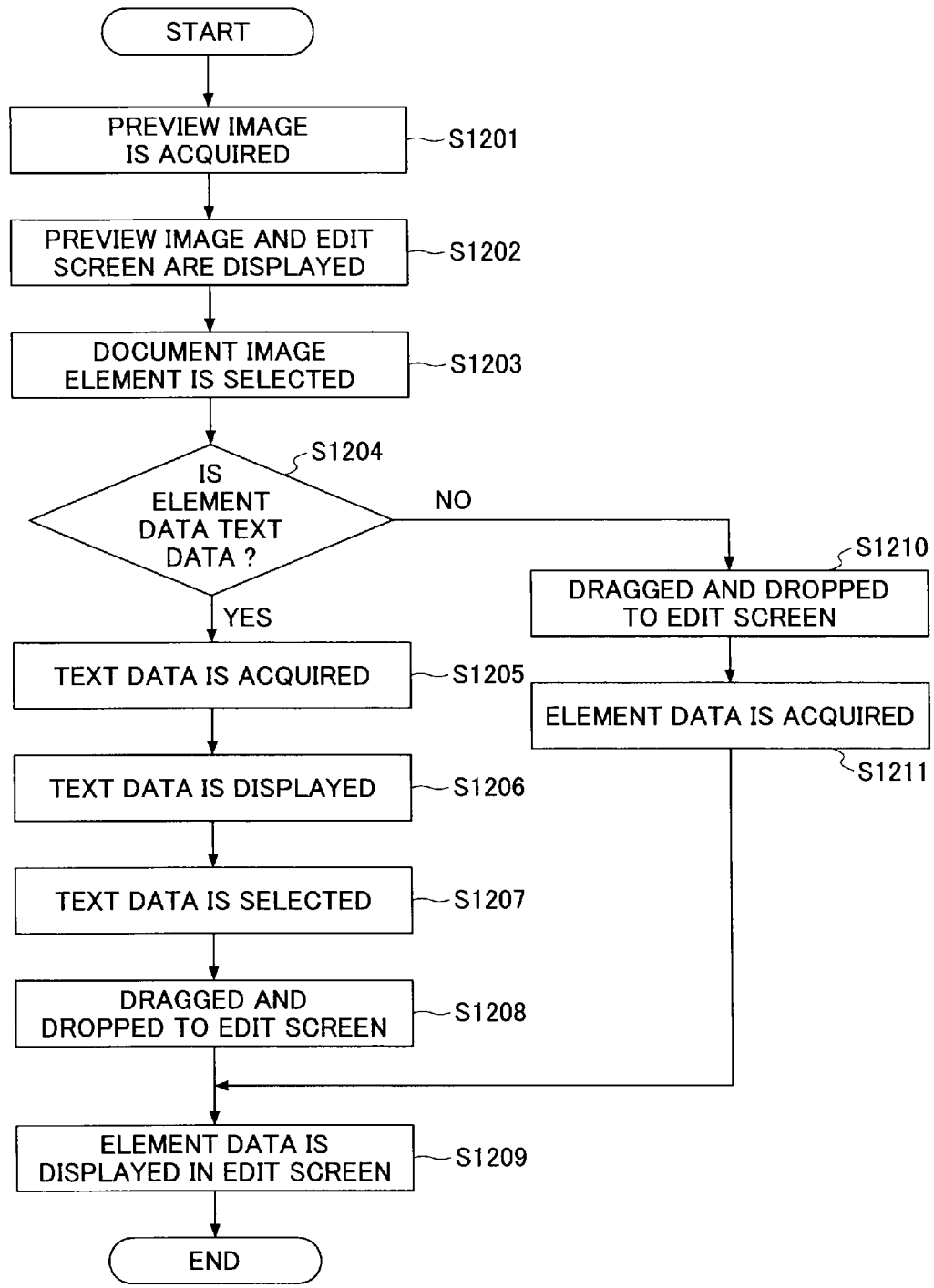
FIG. 12 is a flowchart for explaining the editing of a document image by the information processing device of the first embodiment.

FIG. 12 is a flowchart for explaining the editing of a document image by the information processing device 300 of the first embodiment.

In step S1201, the information processing device 300 acquires the preview image data of document image data. The acquisition of the preview image data is the same as mentioned above.

Progressing to step S1202 following step S1201, the display control unit 350 displays a preview image on the display device 32 based on the acquired preview image data. In this preview image displayed, the rectangles which indicate the areas of the document image elements respectively are also displayed. The editing unit 360 displays the edit screen of the document image on the display device 32.

Progressing to step S1203 following step S1202, a document image element in the preview image is selected by the document image element selecting unit 330.

In the preview image 90 of this embodiment, if the cursor is placed at a point within the area enclosed by one of the rectangles 94A, 94B and 94C and it is clicked by the pointing device, such as a mouse, it is determined that the corresponding one of the document image elements 91, 92 and 93 for the clicked one of the rectangles 94A, 94B and 94C is selected. Therefore, the document image element selecting unit 330 of this embodiment is arranged to receive an output signal of the input unit 31.

If the document image element is selected in the information processing device 300, the selection command and the position information of the selected document image element are transmitted to the MFP 200.

Progressing to step S1204 following step S1203, the information processing device 300 acquires the element data corresponding to the selected document image element. Moreover, in step S1204, it is determined whether the element data corresponding to the document image element selected at step S1203 is text data.

When the element data corresponding to the document image element selected at step S1203 is text data, the control progresses to step S1205. In step S1205, the information processing device 300 causes the element data acquiring unit 340 to acquire the text data corresponding to the selected document image element as element data based on the area information and the text data which are acquired together with the preview image data. Specifically, the element data acquiring unit 340 extracts the text data within the area indicated by the area information, from the text data acquired together with the preview image data, and takes the obtained text data as the element data.

Progressing to step S1206 following step S1205, the information processing device 300 causes the display control unit 350 to display the text data (the element data) acquired at the step S1205 in the preview image.

Alternatively, the display control unit 350 may be arranged to display a window in a vicinity of the selected document image element in the preview image and display the corresponding text data within the window.

In the above embodiment, the selection of the document image element is performed at the time of clicking the inside of the rectangular area using the mouse or the like. The present invention is not limited to this embodiment. For example, the above embodiment may be modified so that, when the cursor is positioned in the rectangular area, the window is displayed and the corresponding text data is displayed therein.

Progressing to step S1207 following step S1206, the information processing device 300 causes the range selecting unit 342 to select a range of the text data to be dragged and dropped from the displayed text data. Specifically, the text data to be dragged and dropped is selected from the text data within the window in which the text data is displayed, by using the pointing devices, such as the mouse. Therefore, the range selecting unit 342 of this embodiment may be constituted by the input unit 31 provided in the information processing device 300.

Progressing to step S1208 following step S1207, the operation of dragging and dropping of the text data selected as an editing object is performed. Thereafter, the information processing device 300 causes the selected range extracting unit 344 to extract the text data in the selected range from the text data acquired by the element data acquiring unit 340.

Finally, progressing to step S1209, the text data extracted by the editing unit 360 is displayed in the edit display.

On the other hand, when the element data corresponding to the document image element selected at the step S1203 is not text data in the step S1204, the control progresses to step S1210. In step S1210, the dragging and dropping of the selected document image element to the edit screen is performed. After the selected document image element is dragged and dropped in the step S1210, the control progresses to step S1211. In step S1211, the information processing device 300 causes the element data acquiring unit 340 to acquire the element data of the selected document image element.

A description will now be given of the acquisition of the element data. In response to the selection command and the position information received from the information processing device 300, the MFP 200 causes the element data extracting unit 260 to acquire the document image data containing the selected document image element from the document-image-data part 282. The element data extracting unit 260 is caused to cut away and extract the element data corresponding to the document image element from the acquired document image data based on the position information. The element data being cut away is the data of the document image data having a resolution higher than that of the preview image. The element data output by the element data providing unit 270 of the MFP 200 is acquired by the element data acquiring unit 350 of the information processing device 300.

Progressing to step S1209 following step S1211, the information processing device 300 causes the editing unit 360 to display the acquired element data in the edit screen.

In this manner, in the information processing device 300 of this embodiment, the element data displayed in the edit screen can be arranged arbitrarily.

As explained above, in this embodiment, each time a document image element is selected from the document image data, the element data corresponding to the selected document image element is cut away and extracted from the document image data. Therefore, it is possible for this embodiment to divide the document image data into document image elements beforehand, without needing to hold the data of each document image element. Thus, it is possible to reduce the memory space needed for accumulation of the document image data.

In this embodiment, if a document image element is selected in a preview image, the element data corresponding to the selected document image element is extracted from the document image data having a resolution higher than that of the preview image. Therefore, it is possible for this embodiment to maintain the quality of the image reused at a high level.

Next, with reference to FIG. 13, the editing of a document image will be explained. FIG. 13 shows an example of a display screen in which a preview image and an edit screen are displayed.

In the display screen 32C of FIG. 13, a preview image 90 and an edit screen 111 are displayed. The preview image 90 displayed in the display screen 32C includes document image elements 91, 92 and 93, and rectangles 94A-94C which indicate the areas of the document image elements 91-93 respectively.

First, the editing of the document image when the element data of the document image element selected at the step S1203 of FIG. 12 is text data will be explained.

In the display screen 32C, the document image element 92 in the preview image 90 is selected as the element data to be reused. In the example of the display screen 32C, the document image element 92 is text data. For example, if the cursor K is placed at a point in the area of the document image element 92 in the preview screen 90 and the document image element 92 is selected by using the mouse, then a window W for displaying text data is displayed in the position below the document image element 92. The text data contained in the area indicated by the rectangle 94B is displayed in the window W.

For example, if the range M of the text data in the window W is selected as the editing object by using the cursor K and the range M is dragged and dropped to the edit screen 111, then the text data 92A in the range M is displayed in the edit screen 111. In this embodiment, the text data in the range M in the window W may be copied so that it is attached to the edit screen 111.

Next, the editing of the document image when the element data of the document image element selected at the step S1203 of FIG. 12 is not text data will be explained.

In the display screen 32C, the document image element 91 in the preview image 90 is selected as the element data to be reused. If the cursor is placed at a point within the rectangle 94A which indicates the area of the document image element 91 in the preview image 90 and the document image element 91 in the rectangle 94A is dragged and dropped to the edit screen 111 in the information processing device 300 of this embodiment, then the element data of the document image element 91 is provided from the MFP 200 to the information processing device 300. The provision of the element data from the MFP 200 is performed in the manner that is the same as described above.

The provided element data 91A of the document image element 91 is attached to the edit screen 111. The element data 91A may be attached to the position which is specified in the edit screen 111 by the cursor at the time of dragging and dropping. Suppose that the document image element 91 in the example of the display screen 32C constitutes an image. Therefore, the element data 91A is the image data extracted from the document image data.

Thus, in this embodiment, when the element data is text data, the text data can be displayed in the preview image 90 before the editing in the edit screen 111 is performed. For this reason, in this embodiment, it can be checked before the editing whether the text data is correctly acquired by the text data acquiring unit 215 at the time of inputting the document image data.

Moreover, in this embodiment, only the part of the text data can be selected as the editing object from the text data displayed in the preview image and the selected text data can be reused. Therefore, in this embodiment, it is no longer necessary to perform complicated operation of deleting the unnecessary data acquired once, when reusing the text data.

According to this embodiment, a document image can be edited by reusing the element data of the document image data stored in the MFP 200, and the document image elements which constitutes the document image data can be reused easily.

The above embodiment may be modified so that the element data which was extracted from the document image data and reused is stored in the page table 284. At this time, the element data may be associated with the page of the document image data containing that element data by the page ID thereof and stored.

In the above embodiment, the element data when the document image element constitutes an image is acquired as image data, and the element data when the document image element constitutes text is acquired as text data. However, the invention is not limited only to the above embodiment.

Alternatively, the information processing device 300 of the above embodiment may be arranged so that, when a predetermined operation is performed in selecting a document image element, a determination as to whether the corresponding element data is acquired as image data or as text data may be performed. In such alternative embodiment, it is necessary that the MFP 200 is able to perform OCR (optical character recognition) processing for the document image data and acquire the character codes of text data corresponding to all the document image elements which constitute the document image data.

For this purpose, when the document image data is input by the document image input unit 205, the MFP 200 of the alternative embodiment may perform OCR processing for the document image data, acquire the character codes of text data obtained as a result of the OCR processing, and store the acquired text data in the page table 284 by associating it with the page of the document image data by the page ID.

Alternatively, the MFP 200 of this embodiment may be arranged to determine that a text data acquisition command is received from the information processing device 300, when the predetermined operation is performed on the information processing device 300 in selecting a document image element constituting an image. In this case, the MFP 200 will provide the text data as the result of OCR processing (instead of the elements data) to the information processing device 300 without extracting the element data from the document image data.

Alternatively, the MFP 200 of this embodiment may be arranged to determine that an image data acquisition command is received from the information processing device 300, when the predetermined operation is performed on the information processing device 300 in selecting a document image element constituting text. In this case, the MFP 200 will provide the elements data as image data (rather than the element data as text data) to the information processing device 300. The element data being provided in this case is the image data extracted from the document image data.

For example, the predetermined operation mentioned above is an operation of clicking the document image element (displayed in the information processing device 300) by the mouse (selection) while depressing a predetermined key of the keyboard, which is performed by the user.

Next, a second embodiment of the invention will be explained. In the second embodiment of the invention, the functions of the Web browser 370 and the editing unit 360 which are arranged in the information processing device 300 of the first embodiment are arranged in the MFP 200.

In the second embodiment, the elements which are the same as corresponding elements in the first embodiment are designated by the same reference numerals, and a description thereof will be omitted.

FIG. 14 shows the composition of a document-image-data providing system 100A of the second embodiment.

The document-image-data providing system 100A of FIG. 14 is constituted by a multi-function peripheral (MFP) 200A and information processing devices 300 which are connected together via a network 400.

As shown FIG. 14, the MFP 200A of this embodiment includes a Web browser 370 and an editing unit 360 (which are the same as corresponding unit in the information processing device 300 of the first embodiment), in addition to the units arranged in the MFP 200 of the first embodiment.

The functions of the Web browser 370 and the editing unit 360 in the second embodiment are the same as those in the first embodiment described above. The MFP 200A of the second embodiment is arranged so that a preview image in which the rectangles which indicate the areas of the document image elements respectively may be displayed on the operation panel 28 of the MFP 200A, and the user on the MFP 200A is allowed to select a document image element from among the displayed ones. The editing of a document image by the MFP 200A can be performed using the element data of the selected document image element. Therefore, according to the second embodiment, the document image data can be easily reused.

The present invention is not limited to the specifically disclosed embodiments, and variations and modifications may be made without departing from the scope of the present invention.

The present application is based on Japanese patent application No. 2007-241585, filed on Sep. 18, 2007, and Japanese patent application No. 2008-209289, filed on Aug. 15, 2008, the contents of which are incorporated herein by reference in their entirety.

What is claimed is:

1. A document-image-data providing device which provides document image data to an information processing device, comprising:

a document image inputting unit configured to input document image data;

an area recognition unit configured to recognize a text area of a document image element containing text data among document image elements constituting the input document image data, and another area of a document image element containing data other than the text data;

a text data acquiring unit configured to acquire text data contained in the text area recognized by the area recognition unit;

a providing unit configured to provide, in response to a document image data request received from the information processing device, both image data generated from the input document image data to have a resolution lower than a resolution of the input document image data and the text data acquired by the text data acquiring unit, to the information processing device;

an image generating unit configured to generate first document image data having a first resolution lower than the resolution of the input document image data and second document image data having a second resolution lower than the first resolution of the first document image data; and an element extracting unit configured to extract, when a document image element of the input document image data is selected in the information processing device, element data of the selected document image element from the input document image data, wherein the providing unit is configured to provide the element data extracted by the element data extracting unit, to the information processing device.

2. An information processing device which is connected to the document-image-data providing device of claim 1, the information processing device comprising:

an acquisition unit configured to acquire the input document image data and the text data contained in the recognized text area from the document-image-data providing device;

a document image element selecting unit configured to select a document image element which constitutes the input document image data, from the input document image data; and a display control unit configured to display, when element data of the document image element selected by the document image element selecting unit is text data, text data corresponding to the element data in the text data acquired by the acquisition unit on a display device.

3. The information processing device according to claim 2, further comprising:

a range selecting unit configured to select a range of text data to be extracted from the text data displayed on the display device; and a selected range extracting unit configured to extract text data in the range selected by the range selecting unit from the text data displayed on the display device.

4. The information processing device according to claim 2, further comprising an element data acquiring unit configured to acquire the element data of the document image element selected by the document image element selecting unit.

5. A document-image-data providing system in which the document-image-data providing device of claim 1 and the information processing device are connected via a network, the information processing device comprising:

an acquisition unit configured to acquire the input document image data and the text data contained in the recognized text area from the document-image-data providing device;

a document image element selecting unit configured to select a document image element which constitutes the input document image data, from the input document image data; and a display control unit configured to display, when element data of the document image element selected by the document image element selecting unit is text data, text data corresponding to the element data in the text data acquired by the acquisition unit on a display device.

6. A document-image-data providing method which is performed by a document-image-data providing device which provides document image data to an information processing device, the document-image-data providing method comprising:

using a processor to perform the steps of a document image inputting step of inputting document image data;

an area recognition step of recognizing a text area of a document image element containing text data among document image elements constituting the input document image data, and another area of a document image element containing data other than the text data;

a text data acquiring step of acquiring text data contained in the text area recognized in the area recognition step;

a providing step of providing, in response to a document image data request received from the information processing device, both image data generated from the input document image data to have a resolution lower than a resolution of the input document image data and the text data acquired in the text data acquiring step, to the information processing device an image generating step of generating a first document image data having a first resolution lower than a resolution of the input document image data and a second document image data having a second resolution lower than the first resolution of the first document image data;

an element data extracting step of extracting, when a document image element of an input document image data is selected in the information processing device, element data of the selected document image element from the input document image data; and an element data providing step of providing the element data extracted by the element data extracting step to the information processing device.

7. An information processing method which is performed by the information processing device concurrently with the document-image-data providing method of claim 6 performed by the document-image-data providing device, the information processing device being connected to the document-image-data providing device, the information processing method comprising:

using a processor to perform the steps of an acquisition step of acquiring the input document image data and the text data contained in the recognized text area from the document-image-data providing device;

a document image element selecting step of selecting a document image element which constitutes the input document image data, from the input document image data; and a display control step of displaying, when element data of the document image element selected in the document image element selecting step is text data, text data corresponding to the element data in the text data acquired in the acquisition step on a display device.

8. A non-transitory computer-readable recording medium storing a computer-readable program which, when executed by a computer of the information processing device, causes the computer to perform the information processing method according to claim 7.

9. A non-transitory computer-readable recording medium storing a computer-readable program which, when executed by a computer of the document-image-data providing device, causes the computer to perform the document-image-data providing method according to claim 6.

* * * * *